United States Patent Office 3,796,799
Patented Mar. 12, 1974

3,796,799
INSECTICIDAL O,O-DIALKYL-β-PHENYLTHIO-VINYL PHOSPHATES
Melancthon S. Brown, Berkeley, Calif., assignor to Chevron Research Company, San Francisco, Calif.
No Drawing. Original application Feb. 12, 1968, Ser. No. 704,557, now Patent No. 3,584,084. Divided and this application Dec. 4, 1970, Ser. No. 128,600
Int. Cl. A01n 9/36
U.S. Cl. 424—216                     7 Claims

ABSTRACT OF THE DISCLOSURE

Vinyl phosphates of the formula:

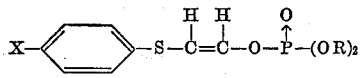

where R is alkyl of 1 to 4 carbon atoms and X is hydrogen, halogen of atomic number 17 to 35 or alkyl of 1 to 4 carbon atoms are used as insecticides and molluscicides.

CROSS REFERENCE TO RELATED APPLICATION

This application is a division of application Ser. No. 704,557, filed Feb. 12, 1968, now U.S. Pat. No. 3,584,-084.

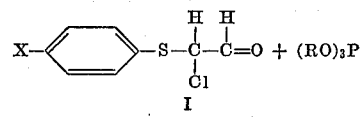

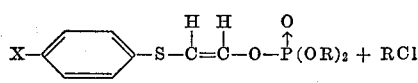

X and R are as defined previously. This reaction will normally be carried out at temperatures in the range of 20 to 150° C. and atmospheric or autogenous pressures. An inert solvent such as benzene, toluene, methylene chloride, chloroform, ethyl ether, etc., will normally be used. The reaction time will usually be about 5 minutes to 48 hours.

The aldehyde reactant (1) may be prepared by reacting a p-substituted phenylsulfenyl halide, preferably a chloride, with acetaldehyde and chlorinating the carbon atom of the resulting product which is between the sulfur and the carbonyl group with a chlorinating agent such as sulfuryl chloride or chlorine. It may also be prepared by reacting a p-substituted alkali metal phenate with chloroacetaldehyde and chlorinating the resulting product as described above. A third procedure to prepare the aldehyde reactant is to react a p-substituted phenylsulfenyl halide with an alkylvinyl ether, react the resulting alkyl-1-halo-2-phenylthio ether with water and chlorinate that reaction product as described above.

EXAMPLES

The following examples illustrate specific vinyl phosphates of this invention and their preparation. These examples are in no way intended to limit the invention described herein. Unless otherwise indicated percentages are by weight.

Example 1

A benzene solution of 14.45 g. 2-chloro-2-p-chlorophenylthioacetaldehyde was put in a flask and heated to reflux. 9 g. of trimethyl phosphite in 10 ml. benzene was then added dropwise to the refluxing mixture. The total mixture was refluxed for 4 hrs. The benzene and excess phosphite were removed at 60° C. under water vacuum to give 19.25 g. of O,O-dimethyl-β-p-chlorophenylthiovinyl phosphate. The Cl and S analyses of this oily compound were—Calculated: Cl, 12.02%; S, 10.85%. Found: Cl, 12.59%; S, 11.30%.

Other vinyl phosphates of this invention were made by the general method described in Example 1. They are reported in Table I.

TABLE I

| Compound | Element analyses, percent ||||||
|---|---|---|---|---|---|---|
| | Calculated ||| Found |||
| | Cl | S | P | Cl | S | P |
| O,O-diethyl-β-p-chlorophenylthiovinyl phosphate | 11.0 | 9.92 | | 11.7 | 10.24 | |
| O,O-dimethyl-β-p-tolylthiovinyl phosphate | | 11.63 | 11.30 | | 11.77 | 10.62 |
| O,O-diethyl-β-p-tolylthiovinyl phosphate | | 10.57 | 10.25 | | 10.61 | 10.10 |
| O,O-diisopropyl-β-p-tolylthiovinyl phosphate | | 9.70 | 9.39 | | 9.31 | 8.40 |
| O,O-diisopropyl-β-p-chlorophenylthiovinyl phosphate | 10.1 | 9.13 | | 10.55 | 9.11 | |
| O,O-di-n-butyl-β-p-chlorophenylthiovinyl phosphate | 9.36 | 8.45 | | 9.24 | 8.31 | |
| O,O-diethyl-β-phenylthiovinyl phosphate | | 11.1 | 10.75 | | 11.05 | 10.60 |
| O,O-dimethyl-β-phenylthiovinyl phosphate | | 12.3 | 11.9 | | 12.01 | 12.0 |

UTILITY

The phosphates of this invention have exhibited exceptional abilities for controlling insects and mollusks. In general their molluscicidal activities are unexpectedly better than those of structurally related compounds. Also, the residual miticidal activities of these phosphates, especially those wherein X in the above formulae is chlorine, are vastly superior to most structurally related compounds.

The terms "insecticide" and "insect" as used herein refer to their broad and commonly understood usuage rather than to those creatures which in the strict biological sense are classified as insects. Thus the term "insect" not only includes small invertebrate animals belonging to the class Insecta, but also other classes of arthropods whose members are segmented invertebrates having more or fewer than six legs such as mites, ticks, spiders, centipedes, worms and the like.

The term "residual" as used herein refers to the longevity of the effectiveness of the phosphate. It expresses the ability of controlling organisms which are not contacted by the phosphate at the time it is applied to the organism's environment.

Phosphates of this invention were tested as insecticides against files, aphids, mites and cockroaches. They were effective against all of these organisms. The unusual residual miticidal activity of these compounds was demonstrated by testing representative phosphates as follows:

A 1% acetone solution of the test phosphate was diluted with water to a concentration of 1000 p.p.m. This mixture was sprayed on 4 replicate pinto bean plants at a dosage of 1000 p.p.m./100 gal./acre. After spraying, the bean plants were placed in a greenhouse and allowed to weather for 24 hours. The plants were then infested with two-spotted mites (Tetranychus telarius L.). After 24 hours a mortality reading was taken on 20 randomly chosen mites. The percent dead out of 20 are represented in Table II. Dimethyl-β-chloro-β-p-chlorophenylthiovinyl phosphate was also tested by this procedure as a comparison compound. Its percent control is also reported in Table II.

The molluscicidal activities of representative phosphates of this invention were determined by contacting common garden snails (Helix spp.) with filter papers impregnated with 20 mgs. of the test phosphate. Two replicates were used with 5 snails per replicate. Mortality readings were made after 24 hours exposure. The effectiveness of each compound, reported as percent control appears in Table II. Dimethyl-β-chloro-β-p-chlorophenyl-thiovinyl phosphate was tested by this procedure as a comparison compound. Its percent control is also reported in Table III.

TABLE II.—RESIDUAL MITICIDAL ACTIVITY

| Compound: | Percent control |
|---|---|
| O,O-dimethyl-β-p-chlorophenylthiovinyl phosphate | 93 |
| O,O-diethyl-β-p-chlorophenylthiovinyl phosphate | 97.5 |
| Comparison compound: O,O-dimethyl-β-chloro-β-p-chlorophenylthiovinyl phosphate | 15 |

TABLE III.—MOLLUSCICIDAL ACTIVITY

| Compound: | Percent control |
|---|---|
| O,O-dimethyl-β-p-chlorophenylthiovinyl phosphate | 90 |
| O,O-diethyl-β-p-chlorophenylthiovinyl phosphates | 100 |
| O,O-diethyl-β-p-chlorophenylsulfonylvinyl phosphte | 100 |
| O,O-diethyl-β-p-tolylthiovinyl phosphate | 100 |
| Comparison compound: O,O-dimethyl-β-chloro-β-p-chlorophenylthiovinyl phosphate | 20 |

It was also discovered that the vinyl phosphates of this invention are significantly less toxic to mammals than corresponding phosphates having a methyl substituent on the α-carbon atom. For instance in oral applications using laboratory rats, O,O-dimethyl-α-methyl-β-p-chlorophenylthiovinyl phosphate was about 45 to 50 times as toxic as O,O-dimethyl-β-p-chlorophenylthiovinyl phosphate. In like tests, O,O-diethyl-α-methyl-β-p-chlorophenylthiovinyl phosphate was about 5 times as toxic as O,O-diethyl-β-p-chlorophenylthiovinyl phosphate. This fact makes the compounds of this invention more desirable than their corresponding α-methyl substituted analogs for use in mammalian environment.

Aside from the specific formulations of the phosphates of this invention as reported in the foregoing tests, these phosphates may be dispersed in or upon other inert liquid and solid carriers. The solid carriers, such as clay, may be in the form of dusts, granules or wettable powders. The liquid diluents which may be used in formulating these phosphates include organic compounds such as acetone, benzene, and toluene. Pesticidal formulations of these phosphates may also contain dispersing agents, emulsifying agents, stickers, stabilizers and the like. These phosphates may be applied individually or in mixtures with other phosphates of this invention, and may also be used with other active compatible toxicants in the formulation of pesticidal compositions.

These phosphates may be applied in insecticidal or molluscicidal quantities directly to the organism. Or, they may be applied to any environmental area which hosts insects or mollusks or are susceptible to their attack. For example, they may be sprayed or otherwise applied directly to plants or other hosts, may be applied to plant seeds, sprayed upon soil or other plant environments or used in similar ways to control insects and mollusks.

As will be evident to those skilled in the art, various modifications on this process can be made or followed, in the light of the foregoing disclosure and discussion, without departing from the spirit or scope of the disclosure or from the scope of the following claims.

What is claimed is:

1. A method of killing insects which comprises contacting said insects with an insecticidally effective amount of a compound of the formula

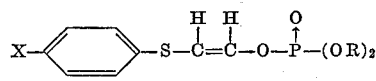

wherein R is alkyl of 1 to 4 carbon atoms, and X is hydrogen, halogen of atomic number 17 to 35 or alkyl of 1 to 4 carbon atoms.

2. The method of claim 1 wherein X is chlorine, hydrogen or methyl.

3. The method of claim 2 wherein R is methyl or ethyl.

4. The method of claim 3 wherein R is methyl and X is chlorine.

5. The method of claim 3 wherein R is ethyl and X is chlorine.

6. An insecticidal composition comprising an insecticidally effective amount of a compound of the formula

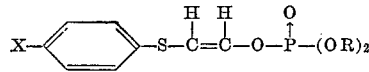

wherein R is alkyl of 1 to 4 carbon atoms, and X is hydrogen, halogen of atomic number 17 to 35 or alkyl of 1 to 4 carbon atoms and a biologically inert carrier.

7. The composition of claim 6 wherein X is chlorine, hydrogen or methyl and R is methyl or ethyl.

References Cited

UNITED STATES PATENTS

| 2,864,740 | 12/1958 | Diveley | 260—948 X |
| 3,584,084 | 6/1971 | Brown | 260—949 |

FOREIGN PATENTS

| 6413169 | 5/1965 | Netherlands | 260—949 |

ALBERT T. MEYERS, Primary Examiner

L. SCHENKMAN, Assistant Examiner

UNITED STATES PATENT OFFICE
CERTIFICATE OF CORRECTION

Patent No. 3,796,799   Dated March 12, 1974

Inventor(s) Melancthon S. Brown

It is certified that error appears in the above-identified patent and that said Letters Patent are hereby corrected as shown below:

FIELD OF INVENTION

This invention relates to novel vinyl phosphates and their use as pesticides. More particularly, it concerns a unique group of O,O-dialkyl-β-phenylthiovinyl phosphates and their use as insecticides and molluscicides.

DESCRIPTION OF INVENTION

The vinyl phosphates of this invention may be represented by the formula:

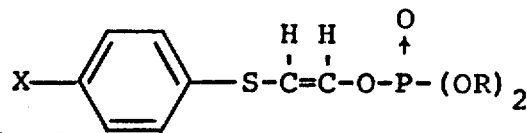

where R is alkyl of 1 to 4 carbon atoms and X is hydrogen, halogen of atomic number 17 to 35 or alkyl of 1 to 4 carbon atoms. The R's may be the same or different. Where R represents propyl or butyl, these radicals are preferably straight chain. X may also be methyl, ethyl, propyl or butyl. Preferably, X is chlorine and R is methyl or ethyl.

Specific examples of vinyl phosphates encompassed within the above genus are O,O-dimethyl-β-p-chlorophenylthiovinyl phosphate, O,O-dimethyl-β-p-bromophenylthiovinyl phosphate, O,O-dimethyl-β-p-butylphenylthiovinyl phosphate, O,O-dimethyl-β-p-tolylthiovinyl phosphate, O-methyl-O-ethyl-β-p-tolylthiovinyl phosphate, O,O-dimethyl-β-p-ethylphenylthiovinyl phosphate, O,O-diethyl-β-p-bromophenylthiovinyl phosphate, O,O-di-n-propyl-β-p-chlorophenylthiovinyl phosphate, O,O-di-isopropyl-β-phenylthiovinyl phosphate, O,O-di-n-propyl-β-p-bromophenylthiovinyl phosphate and O,O-di-n-butyl-β-p-chlorophenylthiovinyl phosphate.

The O,O-dialkyl-β-substituted vinyl phosphates of this invention may be prepared by reacting an appropriate aldehyde with a trialkyl phosphite. This reaction proceeds according to the following equation:

Signed and sealed this 30th day of July 1974.

(SEAL)
Attest:

McCOY M. GIBSON, JR.          C. MARSHALL DANN
Attesting Officer              Commissioner of Patents